United States Patent
Chen et al.

(10) Patent No.: US 7,561,481 B2
(45) Date of Patent: Jul. 14, 2009

(54) MEMORY CONTROLLERS AND PAD SEQUENCE CONTROL METHODS THEREOF

(75) Inventors: Nan-Cheng Chen, Hsinchu (TW); Chih-Hui Kuo, Hsinchu (TW); Jui-Hsing Tseng, Hsinchu County (TW); Ching-Chih Li, Taipei County (TW); Pei-San Chen, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 262 days.

(21) Appl. No.: 11/760,955

(22) Filed: Jun. 11, 2007

(65) Prior Publication Data

US 2008/0304352 A1  Dec. 11, 2008

(51) Int. Cl.
*G11C 7/00* (2006.01)

(52) U.S. Cl. .......................... 365/189.12; 365/230.02; 365/233.13

(58) Field of Classification Search ................ 365/189, 365/230.02, 233.13; 710/309; 711/154
See application file for complete search history.

(56) References Cited

U.S. PATENT DOCUMENTS

| 7,177,230 B1 * | 2/2007 | Huang ...................... 365/233.1 |
| 7,193,909 B2 * | 3/2007 | Huang ........................ 365/193 |
| 7,486,105 B2 * | 2/2009 | Li ................................ 326/30 |

\* cited by examiner

*Primary Examiner*—Pho M Luu
*Assistant Examiner*—Toan Le
(74) *Attorney, Agent, or Firm*—Thomas, Kayden, Horstemeyer & Risley

(57) ABSTRACT

Memory controllers and methods of optimizing pad sequences thereof are provided. At least two different preferred trace sequences on printed circuit boards for at least one memory device are first provided. One memory controller is then provided to have a core logic circuit, a plurality of input/output (I/O) devices, and a reorderer. The core logic has I/O terminals. Each I/O device on the single chip has a pad. The reorderer is coupled between the core logic circuit and the input/output devices, programmable to selectively connect the input/output devices to the input/output terminals. The reorderer is later programmed to select and connect a portion of the input/output devices to the input/output terminals such that one of the different preferred trace sequences is substantially supported.

11 Claims, 16 Drawing Sheets

84-ball FBGA (μBGA)
(×16 organization)

|   | 1 | 2 | 3 | 7 | 8 | 9 |
|---|---|---|---|---|---|---|
| A | VDD | NC | VSS | VSSQ | /UDQS | VDDQ |
| B | DQ14 | VSSQ | UDM | UDQS | VSSQ | DQ15 |
| C | VDDQ | DQ9 | VDDQ | VDDQ | DQ8 | VDDQ |
| D | DQ12 | VSSQ | DQ11 | DQ10 | VSSQ | DQ13 |
| E | VDD | NC | VSS | VSSQ | /LDQS | VDDQ |
| F | DQ6 | VSSQ | LDM | LDQS | VSSQ | DQ7 |
| G | VDDQ | DQ1 | VDDQ | VDDQ | DQ0 | VDDQ |
| H | DQ4 | VSSQ | DQ3 | DQ2 | VSSQ | DQ5 |
| J | VDDL | VREF | VSS | VSSDL | CK | VDD |
| K |  | CKE | /WE | /RAS | /CK | ODT |
| L | NC | BA0 | BA1 | /CAS | /CS |  |
| M |  | A10 | A1 | A2 | A0 | VDD |
| N | VSS | A3 | A5 | A6 | A4 |  |
| P |  | A7 | A9 | A11 | A8 | VSS |
| R | VDD | A12 | NC | NC | NC |  |

(Top view)

| ODT | RAS# | CS# | CAS# | RA0 | RA4 | RA8 | RA13 | RA11 | RA6 | RA2 | RA1 | RA10 | RA9 | RA5 | RA12 | RA7 | RA3 | BA1 | BA0 | WE# | CKE | VREF |
|---|---|---|---|---|---|---|---|---|---|---|---|---|---|---|---|---|---|---|---|---|---|---|
| DQ4 | DQ3 | DQ1 | DQ6 | DQ7 | DQ0 | DQ2 | DQ5 | DQS0 | DQS0# | DQM0 | DQM1 | DQS1 | DQS1# | DQ12 | DQ11 | DQ9 | DQ14 | DQ15 | DQ8 | DQ10 | DQ13 | CLKA | CLKA# |

FIG. 6C

| RA11 | RA9 | RA8 | RA7 | RA6 | RA5 | RA4 | WE# | CAS# | RAS# | CS# | BA0 | BA1 | RA10 | RA0 | RA1 | RA2 | RA3 | VREF |
|---|---|---|---|---|---|---|---|---|---|---|---|---|---|---|---|---|---|---|
| DQ0 | DQ1 | DQ2 | DQ3 | DQ4 | DQ5 | DQ6 | DQ7 | DQS0 | DQM0 | DQM1 | DQS1 | DQ15 | DQ14 | DQ13 | DQ12 | DQ11 | DQ10 | DQ9 | DQ8 | DCLK# | DCLK | CKE | RA12 |

FIG. 6B

| DQ19 | DQ17 | DQ22 | DQ23 | DQ16 | DQ18 | DQ21 | DQS2 | DQS2# | DQM2 | DQM3 | DQS3 | DQS3# | DQ28 | DQ27 | DQ25 | DQ30 | DQ31 | DQ24 | DQ26 | DQ29 |
|---|---|---|---|---|---|---|---|---|---|---|---|---|---|---|---|---|---|---|---|---|
| ODT | RAS# | CS# | CAS# | RA0 | RA4 | RA8 | RA13 | RA11 | RA6 | RA2 | RA1 | RA10 | RA9 | RA5 | RA12 | RA7 | RA3 | BA1 | BA0 | WE# | CKE | VREF | DQ20 |
| DQ4 | DQ3 | DQ1 | DQ6 | DQ7 | DQ0 | DQ2 | DQ5 | DQS0 | DQS0# | DQM0 | DQM1 | DQS1 | DQS1# | DQ12 | DQ11 | DQ9 | DQ14 | DQ15 | DQ8 | DQ10 | DQ13 | CLKA | CLKA# |

FIG. 6A

| DQ21 | DQ22 | DQ23 | DQS2 | DQM2 | DQM3 | DQS3 | DQ31 | DQ30 | DQ29 | DQ28 | DQ27 | DQ26 | DQ25 | DQ24 |
|---|---|---|---|---|---|---|---|---|---|---|---|---|---|---|
| RA11 | RA9 | RA8 | RA7 | RA6 | RA5 | RA4 | WE# | CAS# | RAS# | CS# | BA0 | BA1 | RA10 | RA0 | RA1 | RA2 | RA3 | VREF | DQ16 | DQ17 | DQ18 | DQ19 | DQ20 |
| DQ0 | DQ1 | DQ2 | DQ3 | DQ4 | DQ5 | DQ6 | DQ7 | DQS0 | DQM0 | DQM1 | DQS1 | DQ15 | DQ14 | DQ13 | DQ12 | DQ11 | DQ10 | DQ9 | DQ8 | DCLK# | DCLK | CKE | RA12 |

| Pad sequence | Text Name |
|---|---|
| 1 | RDQ3 |
| 2 | RDQ2 |
| 3 | RDQ4 |
| 4 | RDQ6 |
| 5 | RDQ7 |
| 6 | RDQ1 |
| 7 | RDQ5 |
| 8 | RDQ0 |
| 9 | RDQS0 |
| 10 | RDQS0_ |
| 11 | RDQM0 |
| 12 | RDQM1 |
| 13 | RDQS1 |
| 14 | RDQS1_ |
| 15 | RDQ12 |
| 16 | RDQ14 |
| 17 | RDQ11 |
| 18 | RDQ9 |
| 19 | RDQ8 |
| 20 | RDQ15 |
| 21 | RDQ13 |
| 22 | RDQ10 |
| 23 | RCLK0 |
| 24 | RCLK0_ |
| 25 | RA0 |
| 26 | RODT |
| 27 | RRAS_ |
| 28 | RCS_ |
| 29 | RCAS_ |
| 30 | RA4 |
| 31 | RA11 |
| 32 | RA8 |
| 33 | RA6 |
| 34 | RA2 |
| 35 | RA10 |
| 36 | RA1 |

| FIG. 7A |
|---|
| FIG. 7B |

FIG. 7A

| 37 | RA5 |
|---|---|
| 38 | RA9 |
| 39 | RA7 |
| 40 | RA3 |
| 41 | RA12 |
| 42 | RBA0 |
| 43 | RBA1 |
| 44 | RWE_ |
| 45 | RCKE |
| 46 | RVREF |
| 47 | RVREF |
| 48 | RDQ19 |
| 49 | RDQ22 |
| 50 | RDQ17 |
| 51 | RDQ20 |
| 52 | RDQ16 |
| 53 | RDQ23 |
| 54 | RDQ18 |
| 55 | RDQ21 |
| 56 | RDQS2 |
| 57 | RDQS2_ |
| 58 | RDQM2 |
| 59 | RDQM3 |
| 60 | RDQS3 |
| 61 | RDQS3_ |
| 62 | RDQ25 |
| 63 | RDQ30 |
| 64 | RDQ28 |
| 65 | RDQ31 |
| 66 | RDQ27 |
| 67 | RDQ24 |
| 68 | RDQ29 |
| 69 | RDQ26 |
| 70 | RCLK1 |
| 71 | RCLK1_ |

FIG. 7B

| PCB order | DDR1x2 BGA | die pad order | PCB order | DDR2x2 BGA | pad order | PCB order | DDR2x1 LQFP | pad order | PCB order | DDR1x1 LQFP | die pad order |
|---|---|---|---|---|---|---|---|---|---|---|---|
| 2 | DQ3 | 1 | 2 | DQ3 | 1 | 1 | DQ3 | 1 | 1 | DQ3 | 1 |
| 7 | DQ2 | 2 | 7 | DQ2 | 2 | 2 | DQ2 | 2 | 2 | DQ2 | 2 |
| 1 | DQ4 | 3 | 1 | DQ4 | 3 | 3 | DQ4 | 3 | 3 | DQ4 | 3 |
| 4 | DQ6 | 4 | 4 | DQ6 | 4 | 4 | DQ6 | 4 | 4 | DQ6 | 4 |
| 5 | DQ7 | 5 | 5 | DQ7 | 5 | 5 | DQ7 | 5 | 5 | DQ7 | 5 |
| 3 | DQ1 | 6 | 3 | DQ1 | 6 | 6 | DQ1 | 6 | 6 | DQ1 | 6 |
| 8 | DQ5 | 7 | 8 | DQ5 | 7 | 7 | DQ5 | 7 | 7 | DQ5 | 7 |
| 6 | DQ0 | 8 | 6 | DQ0 | 8 | 8 | DQ0 | 8 | 8 | DQ0 | 8 |
| 9 | DQS0 | 9 | 9 | DQS0 | 9 | 9 | DQS0 | 9 | 9 | DQS0 | 9 |
| 10 | xxxx | 10 | 10 | DQS0# | 10 | 10 | DQS0# | 10 | 10 | xxx | 10 |
| 11 | DQM0 | 11 | 11 | DQM0 | 11 | 11 | DQM0 | 11 | 11 | DQM0 | 11 |
| 12 | DQM1 | 12 | 12 | DQM1 | 12 | 12 | DQM1 | 12 | 12 | DQM1 | 12 |
| 14 | DQS1 | 13 | 14 | DQS1 | 13 | 13 | DQS1 | 13 | 13 | DQS1 | 13 |
| 13 | xxxx | 14 | 13 | DQS1# | 14 | 14 | DQS1# | 14 | 14 | xxx | 14 |
| 15 | DQ12 | 15 | 15 | DQ12 | 15 | 15 | DQ12 | 15 | 15 | DQ12 | 15 |
| 18 | DQ14 | 16 | 18 | DQ14 | 16 | 16 | DQ14 | 16 | 16 | DQ14 | 16 |
| 16 | DQ11 | 17 | 16 | DQ11 | 17 | 17 | DQ11 | 17 | 17 | DQ11 | 17 |
| 17 | DQ9 | 18 | 17 | DQ9 | 18 | 18 | DQ9 | 18 | 18 | DQ9 | 18 |
| 20 | DQ8 | 19 | 20 | DQ8 | 19 | 19 | DQ8 | 19 | 19 | DQ8 | 19 |
| 19 | DQ15 | 20 | 19 | DQ15 | 20 | 20 | DQ15 | 20 | 20 | DQ15 | 20 |
| 22 | DQ13 | 21 | 22 | DQ13 | 21 | 21 | DQ13 | 21 | 21 | DQ13 | 21 |

| 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|---|---|---|---|---|---|
| DQ10 | DCLK | DCLK# | xxx | CKE | RA12 | RA11 | RA9 | RA8 | RA7 | RA6 | RA5 | RA4 | WE# | CAS# | RAS# | CS# | BA0 | BA1 | RA10 | RA0 | RA1 | RA2 | RA3 | VREF |

| 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|---|---|---|---|---|---|
| DQ10 | CLKA | CLKA# | ODT | RAS# | CS# | CAS# | RA0 | RA4 | RA8 | RA11 | RA6 | RA2 | RA1 | RA10 | RA9 | RA5 | RA12 | RA7 | RA3 | BA1 | BA0 | WE# | CKE | VREF |

| 21 | 24 | 23 | 29 | 25 | 26 | 27 | 28 | 30 | 32 | 31 | 33 | 34 | 36 | 35 | 38 | 37 | 40 | 41 | 39 | 43 | 42 | 44 | 45 | 46 |
|---|---|---|---|---|---|---|---|---|---|---|---|---|---|---|---|---|---|---|---|---|---|---|---|---|
| DQ10 | CLKA | CLKA# | RA0 | ODT | RAS# | CS# | CAS# | RA4 | RA11 | RA8 | RA6 | RA2 | RA10 | RA1 | RA5 | RA9 | RA7 | RA3 | RA12 | BA0 | BA1 | WE# | CKE | VREF |

| 21 | 24 | 23 | 29 | 25 | 26 | 27 | 28 | 30 | 32 | 31 | 33 | 34 | 36 | 35 | 38 | 37 | 40 | 41 | 39 | 43 | 42 | 44 | 45 | 46 |
|---|---|---|---|---|---|---|---|---|---|---|---|---|---|---|---|---|---|---|---|---|---|---|---|---|
| DQ10 | DCLK | DCLK# | RA9 | xxxx | CKE | RA12 | RA11 | RA8 | RA6 | RA7 | RA5 | RA4 | CAS# | WE# | CS# | RAS# | BA1 | RA10 | BA0 | RA1 | RA0 | RA2 | RA3 | VREF |

FIG. 8B

| 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 |
|---|---|---|---|---|---|---|---|---|---|---|---|---|---|---|---|---|---|---|---|---|---|---|
| VREF | DQ19 | DQ22 | DQ17 | DQ20 | DQ16 | DQ23 | DQ18 | DQ21 | DQS2 | DQS2# | DQM2 | DQM3 | DQS3 | DQS3# | DQ25 | DQ30 | DQ28 | DQ31 | DQ27 | DQ24 | DQ29 | DQ26 |
| 47 | 49 | 51 | 50 | 48 | 53 | 52 | 54 | 55 | 57 | 56 | 58 | 59 | 60 | 61 | 64 | 65 | 62 | 66 | 63 | 67 | 69 | 68 |

RCLK1
RCLK1_

| 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 |
|---|---|---|---|---|---|---|---|---|---|---|---|---|---|---|---|---|---|---|---|---|---|---|
| VREF | DQ19 | DQ22 | DQ17 | DQ20 | DQ16 | DQ23 | DQ18 | DQ21 | DQS2 | xxxx | DQM2 | DQM3 | DQS3 | xxxx | DQ25 | DQ30 | DQ28 | DQ31 | DQ27 | DQ24 | DQ29 | DQ26 |
| 47 | 49 | 51 | 50 | 48 | 53 | 52 | 54 | 55 | 57 | 56 | 58 | 59 | 60 | 61 | 64 | 65 | 62 | 66 | 63 | 67 | 69 | 68 |

RCLK1
RCLK1_

MEMORY CONTROLLERS AND PAD SEQUENCE CONTROL METHODS THEREOF

BACKGROUND OF THE INVENTION

1. Field of the Invention

The invention relates to memory control, and in particular to memory controllers providing alternative pad sequences and pinout sequences.

2. Description of the Related Art

Memory is essential in most electronic applications, generally requiring not only high capacity but also high data transfer rate. One type of DRAM is DDR (Double Data Rate), providing increased bandwidth over preceding single-data-rate SDRAM (synchronous dynamic random access memory) by transferring data on both the rising and falling edges of a clock signal.

DDR (DDR1) is superseded by DDR2, implementing modifications to allow higher clock frequency, but operating on the same principle as DDR1. DDR2 has become a logical progression for memory standards and speeds, incorporating several new designs and specifications which play a part in increased speed. For example, DDR2 requires on-die termination (ODT) to eliminate excess signal noise while DDR1 requires only on-board termination. DDR2 and DDR1 use different external voltages (2.5 V and 1.8 V). DDR2 requires off-chip driver (OCD) impedance calibration while DDR1 does not. DDR2 uses a 4-bit prefetch while DDR1 uses a 2-bit prefetch. DDR2, using a Fine Ball Grid Array (FBGA), can be made smaller then DDR1 which uses Thin Small Outline Package (TSOP).

DDR2 and DDR1 are currently in a transitional stage in the field of electronic applications. Some cost-sensitive electronic applications may prefer DDR1 to DDR2, even though DDR2 is superior in performance. To support evolving requirements, the two designs and specifications are often combined in a single chip such that timely development and supply of various types of DRAMs or memory controllers can be achieved. A circuit supporting DDR1 and DDR2 on the same chip through interconnection layer switching has been introduced. Switching to accommodate different standardized on-chip designs and specifications for DDR1 and DDR2 has been implemented in the DDR1/DDR2 mixed chip. Nevertheless, satisfactory support of both DDR1 and DDR2 entails more than standardized on-chip designs and specifications.

BRIEF SUMMARY OF THE INVENTION

Embodiments of the invention provide a memory controller on a single chip. The memory controller comprises a core logic circuit, input/output (I/O) devices and a reorderer. The core logic circuit on the single chip has I/O terminals. Each I/O device has a pad. The reorderer is coupled between the input/output terminals and the input/output devices, programmable to selectively connect the input/output devices to the input/output terminals. Thus, at least two different pad sequences, each communicating with at least one memory device, are provided and supported by the single chip.

Embodiments of the invention provide a method of optimizing pad sequence of a memory controller. At least two different preferred trace sequences on printed circuit boards for at least one memory device are first provided. The memory controller comprises a core logic circuit, a plurality of input/output (I/O) devices, and a reorderer. The core logic circuit has I/O terminals. Each I/O device on the single chip has a pad. The reorderer is coupled between the core logic circuit and the input/output devices, programmable to selectively connect the input/output devices to the input/output terminals. The reorderer is later programmed to select and connect a portion of the input/output devices to the input/output terminals such that one of the different preferred trace sequences is substantially supported.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIGS. 2A and 2B show two pinouts respectively corresponding to DDR1 and DDR2 SDRAMs.

FIGS. 6A-6D illustrate different preferred trace sequences on different PCBs requiring support from a memory controller on a single chip.

FIG. 7 shows a pad placement supporting the trace sequences in FIGS. 6A-6D.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
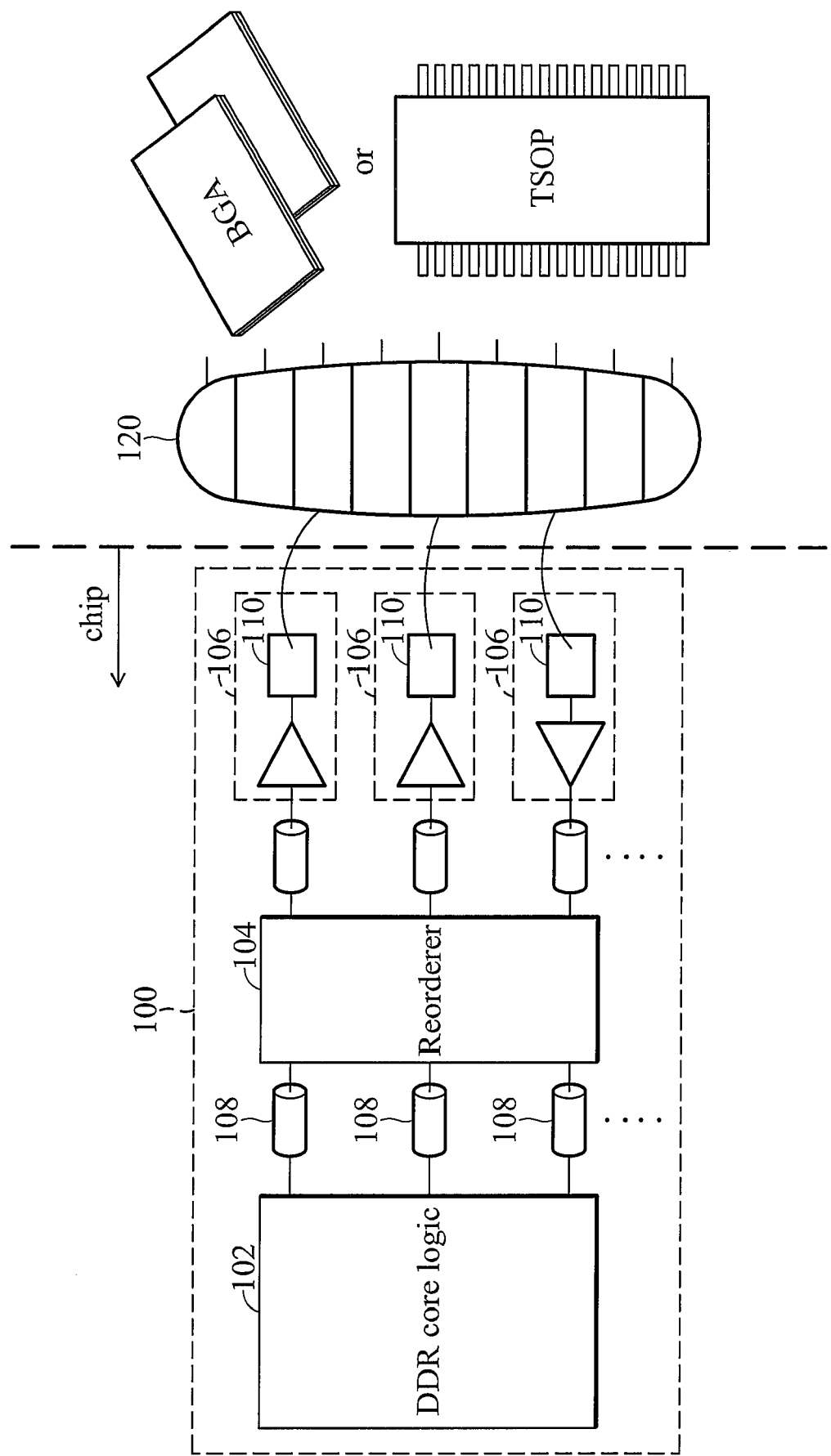
FIG. 1 illustrates a system with a chip having a memory controller according to embodiments of the present invention.

FIG. 1 illustrates a system with a chip having a memory controller according to embodiments of the present invention. On a single chip, memory controller 100 comprises DDR core logic 102, reorderer 104 and input/output (I/O) devices 106. DDR logic core 102 has several I/O terminals 108. DDR core logic 102 supports both DDR1 and DDR2. Each I/O device 106 has a pad 110, through which memory controller 100 can be electrically connected to a printed circuit board (PCB) 120 to access data in a memory. Reorderer 104 between DDR core logic 102 and I/O devices 106 is programmable to selectively connect input/output devices 106 to input/output terminals 108, enabling memory controller 100 to provide different pad sequences accordingly. For example, the pad sequence of memory controller 100 for controlling a DDR1 SDRAM may be different from that controlling a DDR2 SDRAM. Alternatively, the pad sequence of memory controller 100 for a PCB supporting a DDR1 SDRAM may be different from that for another PCB supporting the same DDR1 SDRAM, since layouts of the PCBs may vary.

Figure 2A:
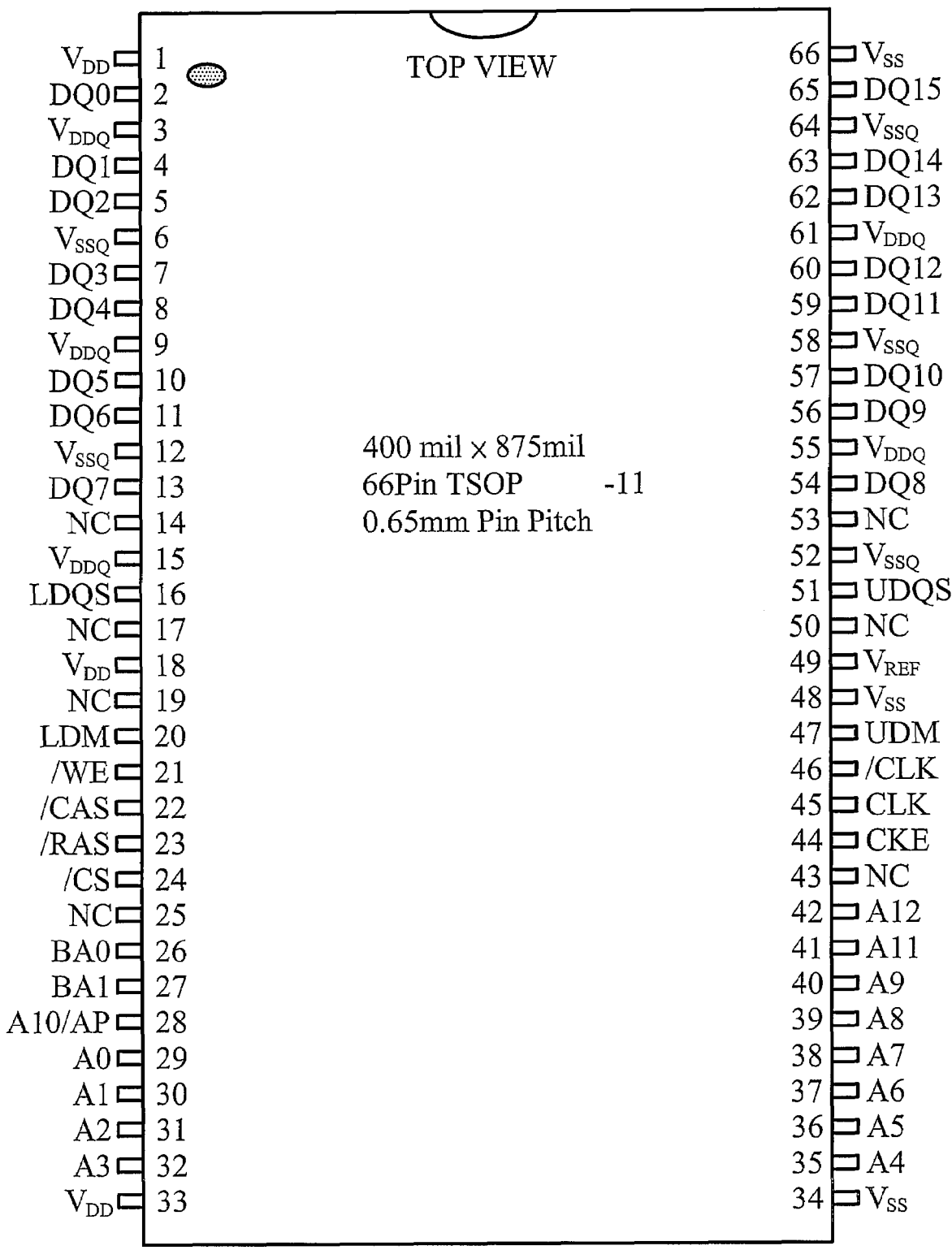

FIGS. 2A and 2B show two pinouts respectively corresponding to DDR1 and DDR2 SDRAMs. JEDEC (Joint Electron Device Engineering Council) has standardized the packages and corresponding pinouts for DDR1 and DDR2 SDRAMs. A DDR1 SDRAM is in a TSOP (Thin Small-Outline Package) with pinout shown in FIG. 2A, while a DDR2 SDRAM is in a FBGA (Fine Ball Grid Array) with pinout shown in FIG. 2B. FIGS. 2A and 2B evidence that pinout sequences for DDR1 and DDR2 SDRAMs are totally different from each other.

Figure 3A:
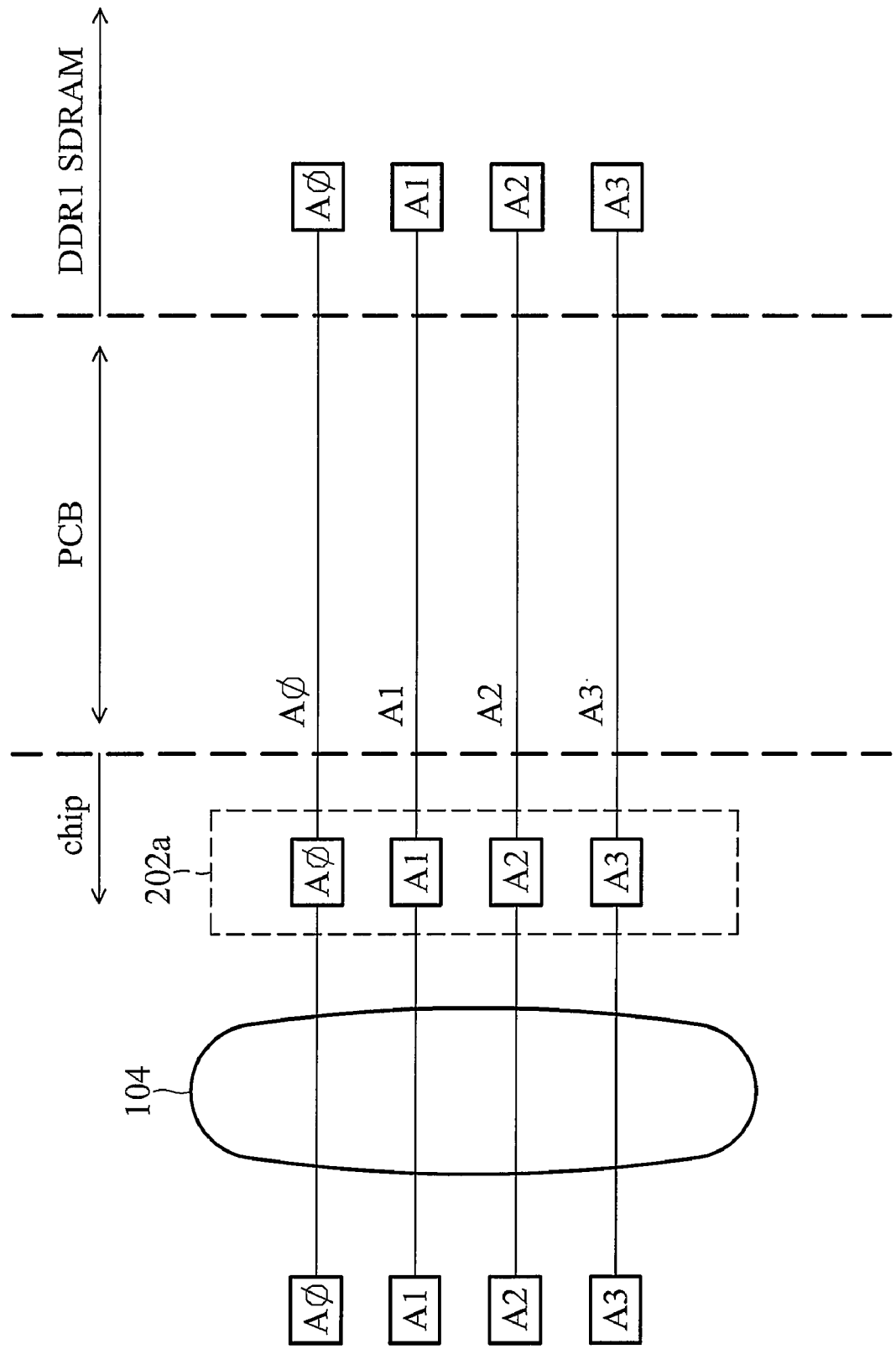
FIGS. 3A and 3B show two different pad sequences provided by a memory controller in a single chip to support DDR1 and DDR2 SDRAMs, respectively.
Figure 3B:
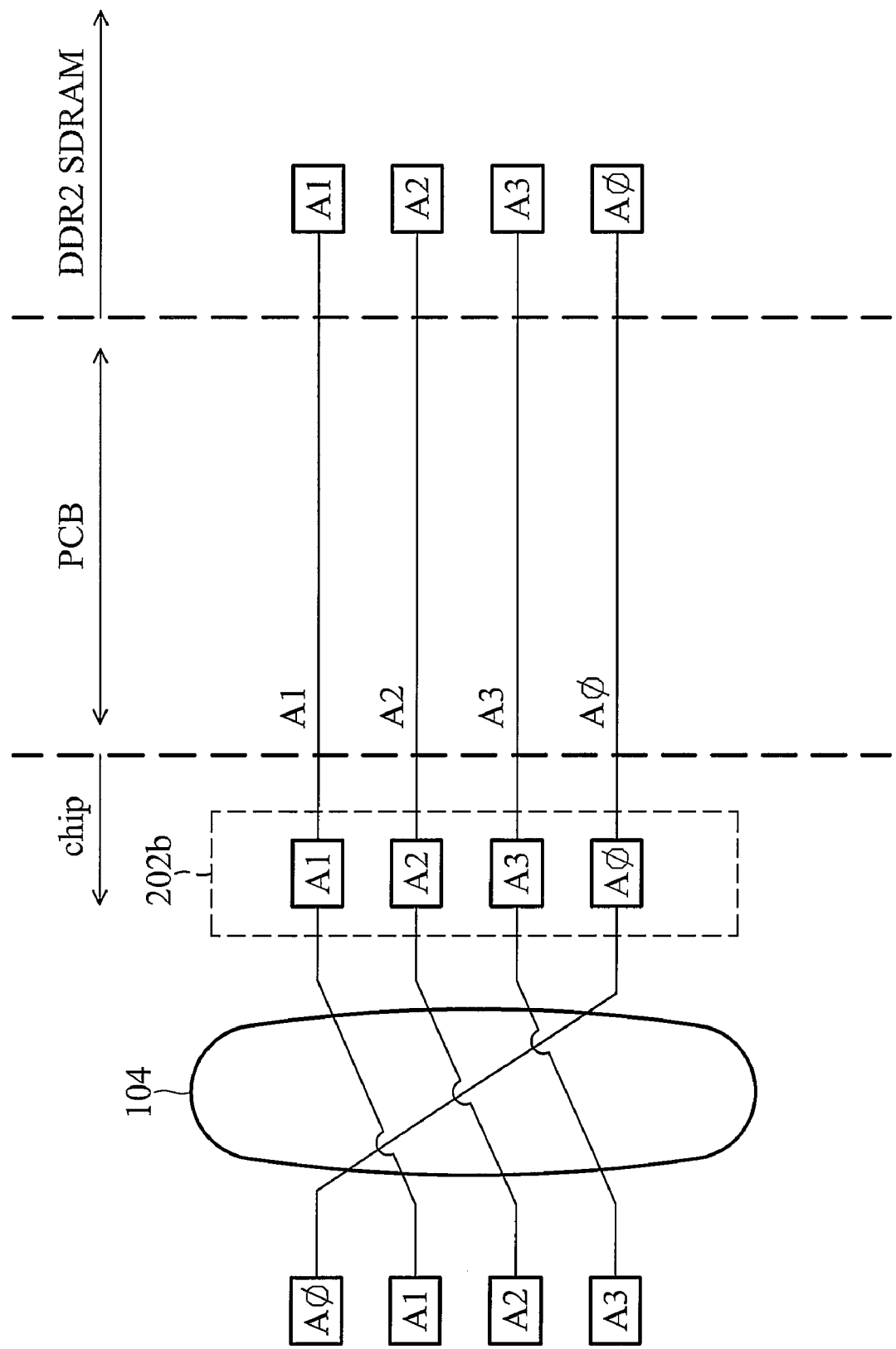

FIGS. 3A and 3B show different pad sequences provided by memory controller 100 in a single chip to support DDR1 and DDR2 SDRAMs, respectively. It is supposed in FIG. 3A that a PCB supporting a DDR1 SDRAM is generally preferred to have a trace sequence of [A0, A1, A2, A3], from top to bottom, when connected to a memory controller, in consideration of PCB shape constraints, transmitted signal quality, pinout of a mounted memory, and the like. To completely or substantially match a pad sequence to the trace sequence, reorderer 104 of memory controller 100 is programmed to connect A0 terminal of DDR core logic 102 to the first I/O device, A1 terminal to the second I/O device, A2 terminal to the third I/O device, and A3 terminal to the fourth I/O device, such that a pad sequence 202a of [A0, A1, A2, A3] as shown in FIG. 3A is generated. Again, another PCB supporting a DDR2 SDRAM preferably comprises a trace sequence of [A1, A2, A3, A0], from top to bottom, when connected to a memory controller. Thus, the same reorderer 104 of memory controller 100 is programmed to generate a pad sequence 202b of [A1, A2, A3, A0], matching the trace sequence shown in FIG. 3B. Performance of both DDR1 and DDR2 systems in FIGS. 3A and 3B is optimized since both the trace sequences of FIGS. 3A and 3B are preferred.

Figure 4:
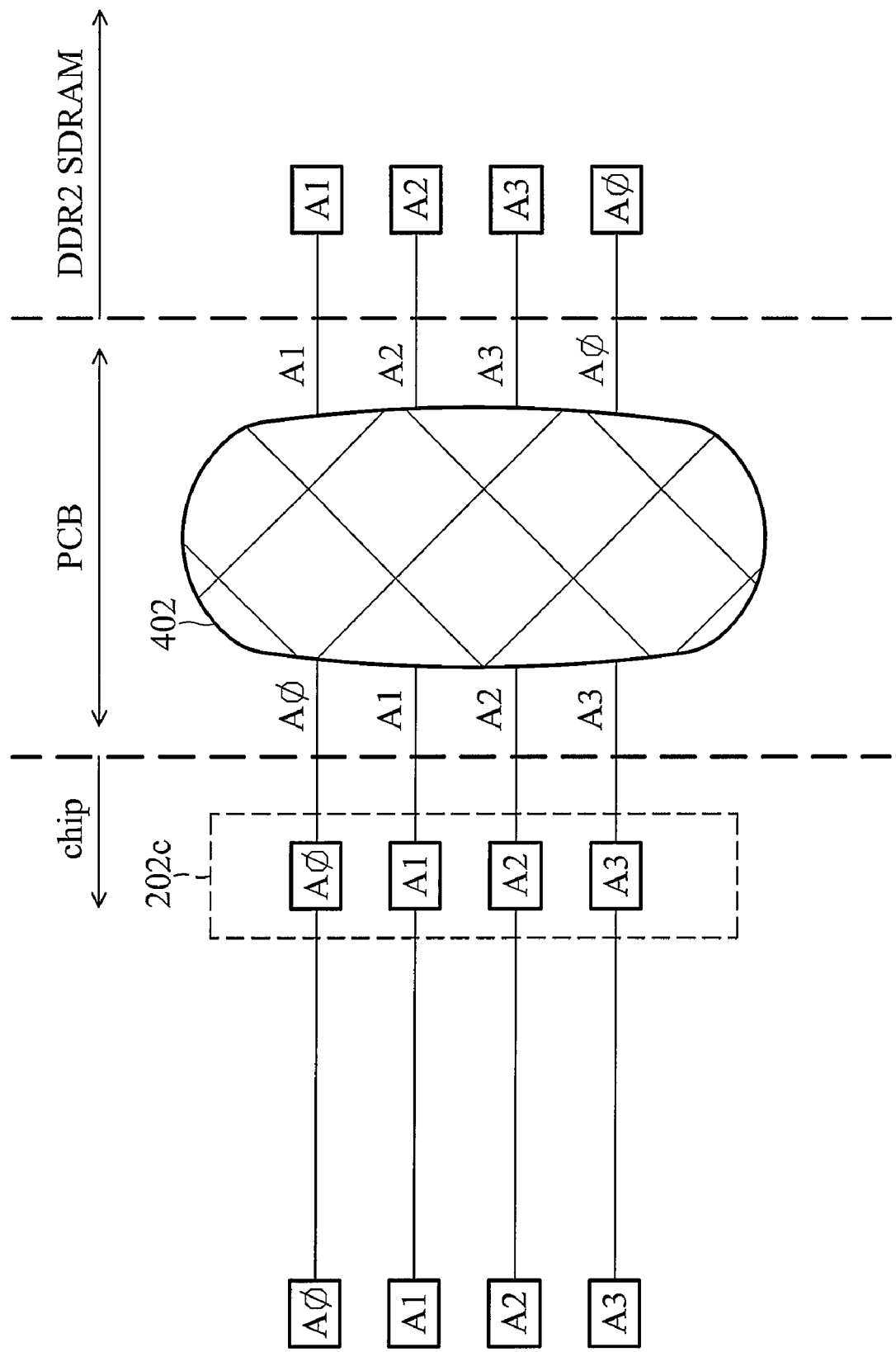
FIG. 4 illustrates a memory controller with no reorderer between a DDR core logic and I/O devices.

FIG. 4 illustrates a memory controller with no reorderer between a DDR core logic and I/O devices, wherein the pad sequence of a memory controller is unchangeable. The unchangeable pad sequence may be designed or optimized to match the trace sequence on a PCB in certain situations, but likely to mismatch a different trace sequence on another PCB. For example, pad sequence 202c in FIG. 4, [A0, A1, A2, A3], has been optimized to perfectly match the preferable trace sequence in FIG. 3A for supporting a DDR1 SDRAM. When it is used to control a DDR2 SDRAM, however, as shown in FIG. 4, the unchangeable pad sequence of the memory controller mismatches the preferable trace sequence shown in FIG. 3B, such that a crisscross pattern 402 inevitably occurs in the PCB, degrading the quality of signal transmitted therein or PCB routing.

Figure 5A:
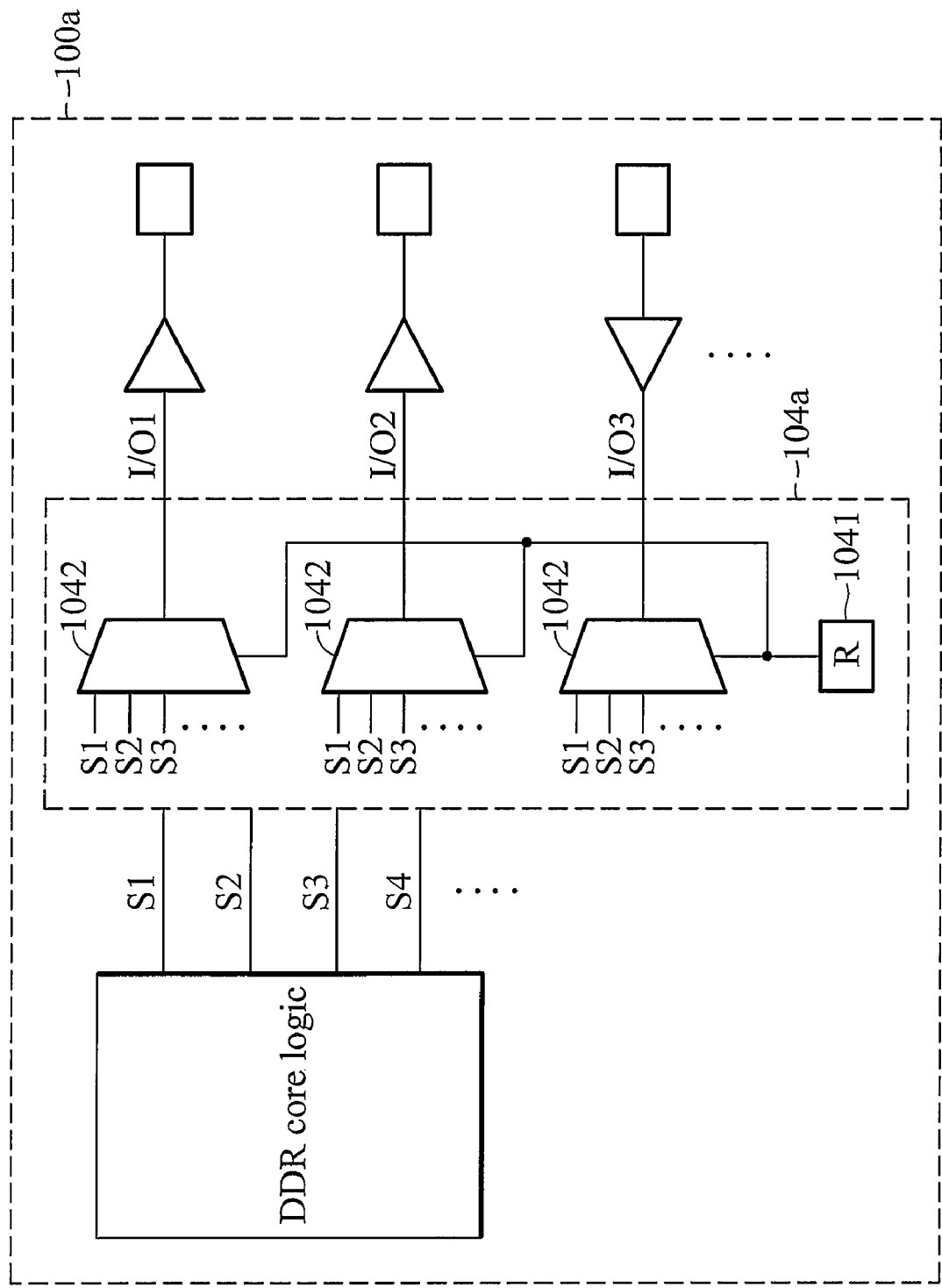
FIGS. 5A and 5B disclose possible implementations of a reorderer in a memory controller.
Figure 5B:
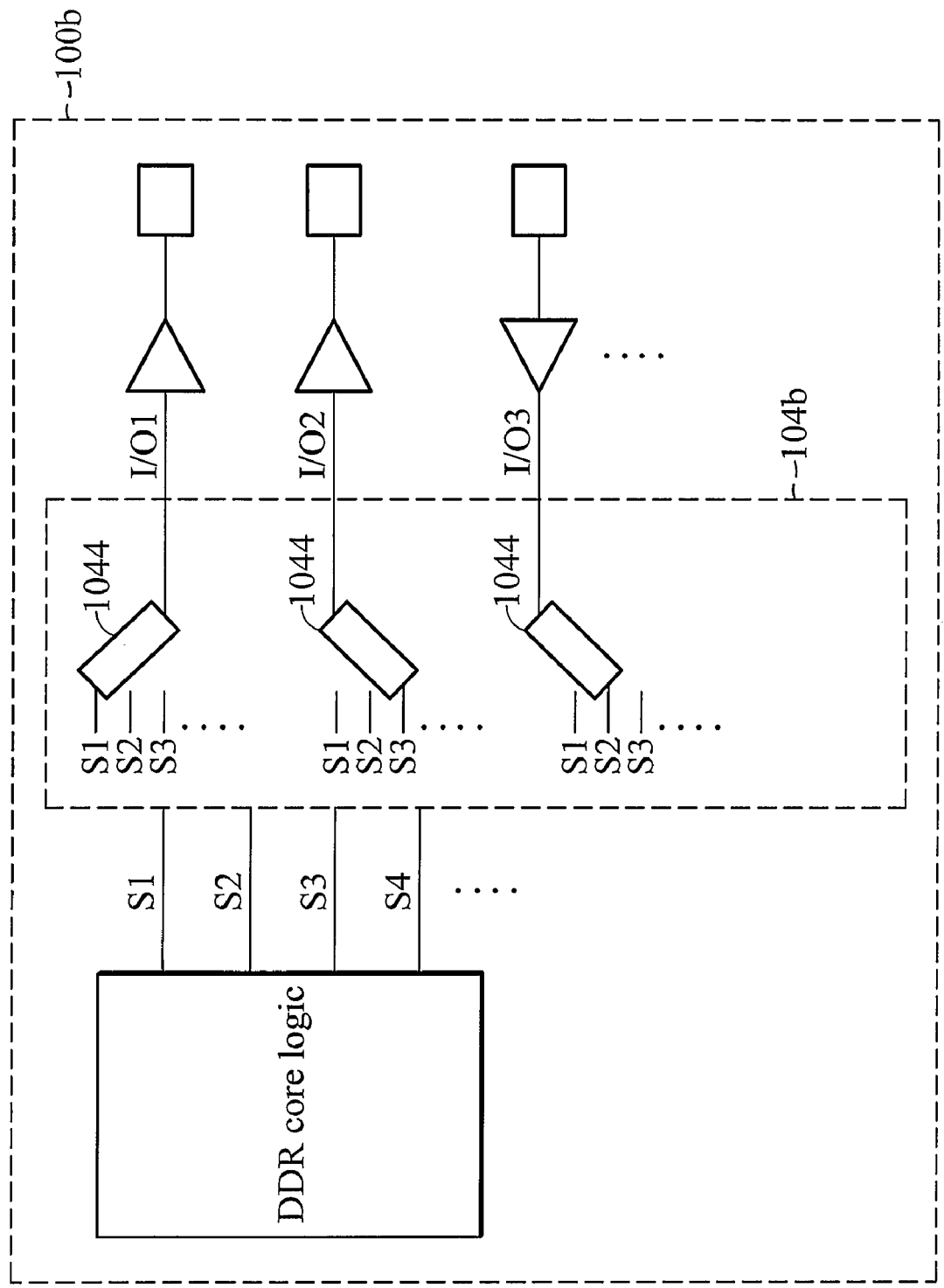

FIGS. 5A and 5B disclose two possible implementations of a reorderer in a memory controller. The reorderer 104a in FIG. 5A comprises multiplexers 1042 and a register set 1041 having at least one register. Register set 1041 can be set by, for example, uploading or updating firmware into the memory controller 100a, to determine the selected port in each multiplexer 1042. For instance, register set 1041, under a register setting, directs multiplexers 1042 to connect terminal S1 to I/O device I/O1, terminal S3 to I/O device I/O2, terminal S2 to I/O device I/O3, and the like. Further, a reorderer can be implemented to program by interconnection layer switching, as exemplified in FIG. 5B. While every interconnection layer is available, a top metal layer of a memory controller chip is preferable to perform metal options because the time-to-market of the chip is the shortest. Several predetermined masks, each corresponding to one programmed reorderer, are prepared for the top metal layer. After completing semiconductor manufacturing, one of the predetermined masks connects I/O devices and terminals of a DDR core logic circuit, while another mask provides another kind of connection. For example, in a programmed reorderer 104b of memory controller 100b of FIG. 5B, metal strips 1044 developed in a top layer by selecting and using one of the predetermined masks connect terminal S1 to I/O device I/O1, terminal S3 to I/O device I/O2, terminal S2 to I/O device I/O3. Also shown in FIG. 5B, a programmed reorderer 104b must have several open ends dangled inside the area of reorderer 104b. Some of these open ends may disappear, being connected between I/O devices and I/O terminals, when using another determined mask for producing another programmed reorderer.

A DDR core logic and I/O devices may be programmed at the same time when a reorderer is programmed, to switch and accommodate different on-chip designs and specifications for DDR1 and DDR2.

Memory controllers in embodiments of the invention may require registration of several preferred trace sequences on PCBs. These preferred trace sequences may be predetermined by circuit designers or supplied by potential system users. FIGS. 6A-6D illustrate different preferred trace sequences for different PCBs requiring support from a memory controller on a single chip.

The trace sequence in FIG. 6A connects two DDR1 SDRAMs that share common control signal traces and common address traces to communicate with a memory controller, while one DDR1 SDRAM uses a group of independent data traces and the other uses the other group of independent data traces. To balance the trace lengths respectively for the two DDR1 SDRAMs, all the control traces commonly-used by the two DDR1 SDRAMs are located in the middle of the trace sequence in FIG. 6A and separate the two groups of independent data traces. The package type for the memory controller supporting the trace sequence in FIG. 6A is BGA. Likewise, the trace sequence in FIG. 6B connects two DDR2 SDRAMs. Similar to FIG. 6A, the control traces commonly used by two DDR2 SDRAMs are located in the middle of the trace sequence in FIG. 6B and separate the two groups of independent data traces. The package type for the memory controller supporting the trace sequence in FIG. 6B is also BGA. As mentioned, to straighten the traces or minimize the number of crisscrosses on a PCB, the data trace sequences in FIGS. 6A and 6B are completely different, even though a DDR2 SDRAM has only two additional data pins over a DDR1 SDRAM. The sequence variation for the commonly-used traces can also be found in FIGS. 6A and 6B.

The trace sequence in FIG. 6C connects one DDR1 SDRAM and that in FIG. 6D connects one DDR2 SDRAM. A memory controller supporting the trace sequence in FIG. 6C or 6D is packaged in the form of Low Profile Quad Flat Pack (LQFP). Similar to the trace sequence difference between FIGS. 6A and 6B, FIGS. 6C and 6D differ completely in their trace sequences even though the trace count of the trace sequence in FIG. 6D outnumbers that of FIG. 6C by only three.

Figures 8A, 8B, 8C:
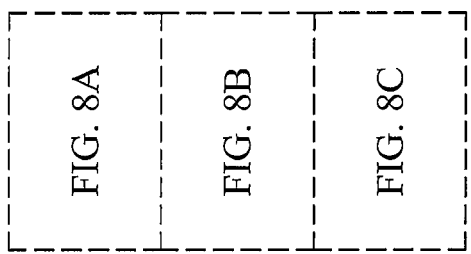
FIG. 8 illustrates relationships between trace sequences in FIGS. 6A-6D and an alternative pad sequence provided by a memory controller.

For a single chip supporting the trace sequences in FIGS. 6A-6D, memory controller 100 as exemplified in FIG. 1 is designed to have a pad placement as shown in FIG. 7. Pads numbered from 1-22 form a group of data pads and those numbered from 48-69 form another group of data pads. Furthermore, reorderer 104 in memory controller 100 might be capable of rendering alternative pad sequences for each corresponding trace sequence in FIGS. 6A-6D. FIG. 8 has four major columns 802a-802d, each defined by a bold-lined frame and representing the relationship between a trace sequence in FIGS. 6A-6D and an alternative pad sequence provided by memory controller 100. Major columns 802a-802d correspond to the trace sequences shown in FIGS. 6A-6D, respectively. As an example, when memory controller 100 supports the PCB with a trace sequence shown in FIG. 6A, reorderer 104 is programmed, providing memory controller 100 with a pad sequence of [DQ3, DQ2, DQ4, DQ6, ... ] as shown by sub-column 804a in major column 802a. An entry with "xxxx", for example entry 806 of sub-column 804a, indicates the I/O device corresponding to the 10$^{th}$ pad is not connected or selected by the programmed reorderer 104, not acting as an I/O device for DDR core logic 102. Other major columns 802b-802d are self-explanatory in view of the above description such that their explanation is omitted.

Please note that in FIG. 8 the connection between I/O terminals for data, such as DQ0-DQ15, and pads is not reordered when a memory controller is used to support another PCB. For example, the first pad in FIG. 8 is constantly connected to I/O terminal DQ3, irrespective of whether a memory controller is programmed to support which one of the trace sequences shown in FIGS. 6A-6D. It is because that as long as a memory controller is capable of accessing the same byte in a memory, the pad sequence for the memory controller accessing that byte does not matter. For example, the first eight traces in each of FIGS. 6A-6D are for the same byte consisting of DQ0-DQ7, and thus the pad sequence in a memory controller for that byte can be any pad sequence consisting of DQ0-DQ7. A constant connection between data I/O terminals and corresponding pads needs no reordering.

Address pad sequences alone provided by a reorderor might not be reordered when applied for different PCBs if each address from the reorderor exactly mapping to only one memory location. Nevertheless, as can be found from the trace sequences in FIG. 6A-6D, the common address traces for memories do not stand alone, but are inevitably switched with the common control signal traces while applied for another PCB. A reorderor is capable of maximizing the matching between pads and the common control signal traces in every application, for example, the address pads and the control pads for a core logic circuit are reordered in different applications shown in FIG. 8.

It can be derived from FIG. 8 that after programming, reorderer 104 in this embodiment must be able to connect the I/O device of the 32$^{th}$ pad to I/O terminal RA7, RA8, RA11, and RA6 of a DDR core logic circuit. In the other words, the reorderer in this embodiment must be able to connect I/O terminal RA7 of a DDR core logic circuit to the I/O device of the 32$^{th}$, 39$^{th}$, 40$^{th}$, or 31$^{th}$ pad. The pad sequence difference as shown between major columns 802a and 802b or between major columns 802c and 802d also discloses that the pinout sequence of the same type of package for memory controller 100 changes based on programming of reorderer 104 in memory controller 100.

Programming of reorderer 104 may take place during manufacture of the chip with the memory controller or after packaging. For example, if interconnection layer switching is employed, reorderer 104 is first programmed by selecting and using a mask among alternatives and the chip with reorderer 104 is then packaged. If register setting is employed, the chip with reorderer 104 may be first manufactured and packaged, and then programmed by uploading firmware into memory controller 100 through package pins. Programming by register setting is preferred because of its relatively shorter time-to-market. The packaging may be multiple chip module packaging or stack-die packaging.

The embodiments of the invention provide alternative pad sequences for a memory controller on a single chip and alternative pinout sequences for a package with the memory controller. The signal paths between a memory controller and a DDR1 or DDR2 memory can be optimized to have minimum trace crisscross on a PCB, such that the quality of the signal transmitted therein is guaranteed.

Even though the invention is embodied utilizing memory controllers for controlling DDR1 and DDR2 memories, it is not limited thereto. DDR3 memories or more advanced DDR memories can be candidates for a memory controller according to the invention to control. Furthermore, a memory controller according to the invention may control other kinds of memory, such as SRAMs, flash memories, etc.

Figure 9:
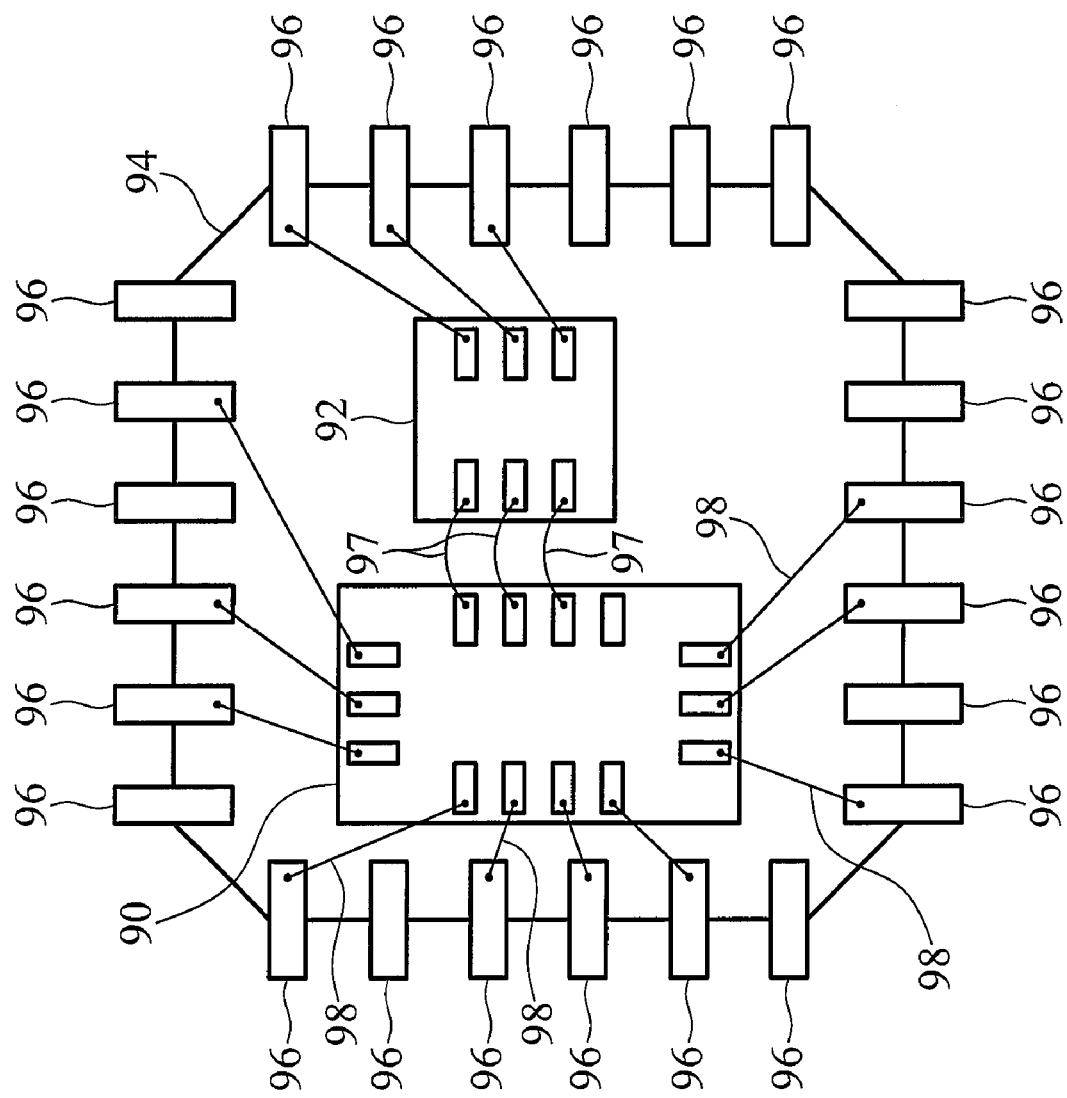
FIGS. 9 and 10 illustrate a Multi Chip Module and a stacked-die package according to embodiments of the invention.

The invention is also applicable to a single chip in a Multi Chip Module (MCM). FIG. 9 illustrates an exemplified MCM, having a package socket 94 with conductive fingers 96 and packaging a single chip 90 and a neighboring memory chip 92. As shown in FIG. 9, both single chip 90 and memory chip 92 have several pads connected to some of the conductive fingers 96 of a socket 94 by bonding wires 98 while single chip 90 is also internally connected to memory chip 92 by internal wires 97. In order to support a different memory chip having a preferred pad sequence different from that of memory chip 92, single chip 90 is designed with the ability of being programmed to provide another pad sequence for those pads purposely connected to a memory chip. Single chip 90 may have a memory controller with a core logic circuit, a reorderer and input/output (I/O) devices as disclosed in FIG. 1. In other words, single chip 90 can be programmed to provide at least two different pad sequences for those pads connected by internal wires 97.

Figure 10:
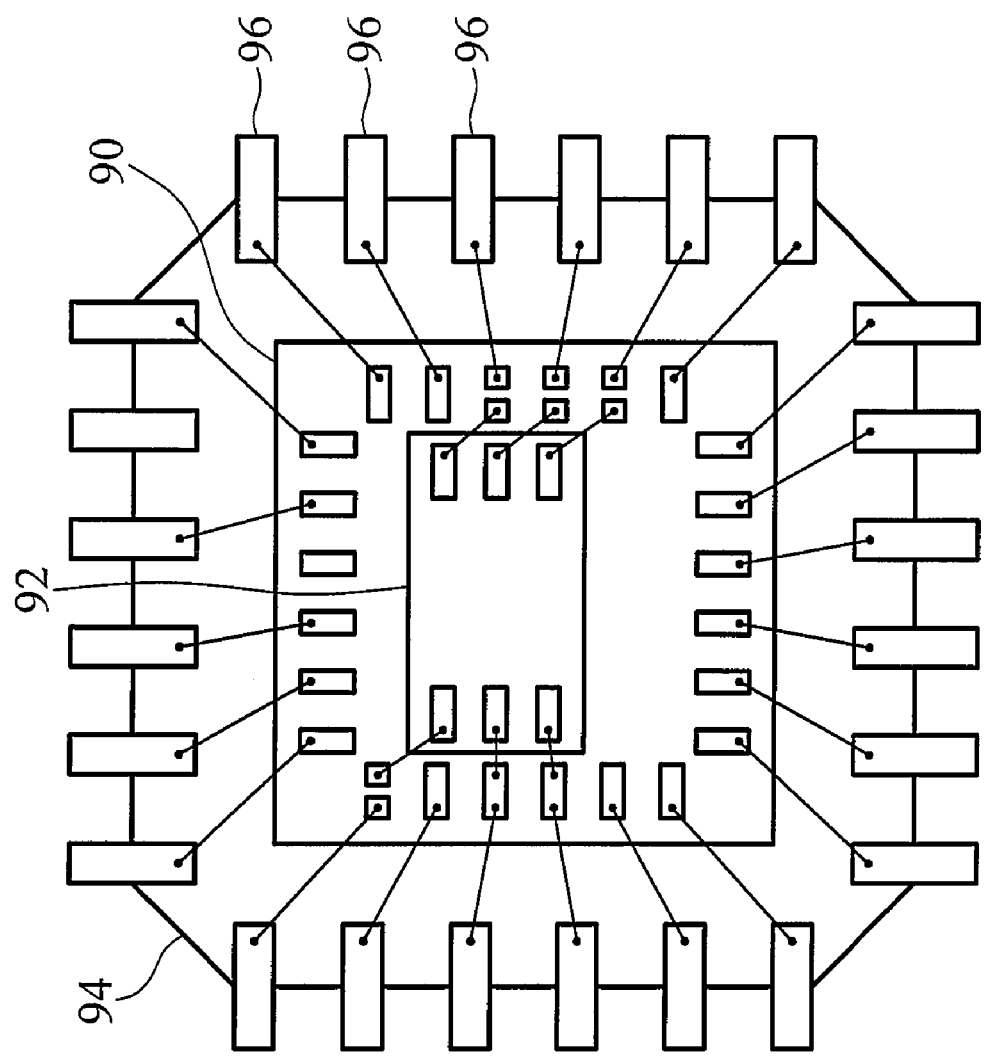

FIG. 10 illustrates a stacked-die package, in which memory chip 92 stacks over single chip 90 inside a package socket 94 with conductive fingers 96. Single chip 90 has pads bonded to either fingers or pads of memory chip 92, or to both. If memory chip 92 is replaced with another memory chip having a different preferred pad sequence, it is preferred that single chip 90 has the ability to provide a corresponding pad sequence and reduces any possible bonding wire crisscrosses occurring above the area between the pads of memory chip 92 and the pads of single chip 90. Accordingly, single chip 90 of FIG. 10 in an embodiment of the invention may have a core logic circuit, a reorderer and input/output (I/O) devices of FIG. 1, being programmable of providing at least two different pad sequences for those pads connected to memory chip 92.

While the invention has been described by way of examples and in terms of preferred embodiment, it is to be understood that the invention is not limited to thereto. To the contrary, it is intended to cover various modifications and similar arrangements (as would be apparent to those skilled in the art). Thus, the scope of the appended claims should be accorded the broadest interpretation to encompass all such modifications and similar arrangements.

What is claimed is:

1. A memory controller on a single chip, comprising:
    a core logic circuit on the single chip, having input/output terminals;
    a plurality of input/output (I/O) devices on the single chip, each having a pad; and
    a reorderer coupled between the input/output terminals and the input/output devices, wherein the reorderer is programmable to selectively connect the input/output devices to the input/output terminals such that at least two different pad sequences, each communicating with at least one memory device, can be provided and supported by the single chip.

2. The memory controller of claim 1, wherein the reorderer is programmed by interconnection layer switching.

3. The memory controller of claim 1, wherein the reorderer comprises:
    a multiplexer connected between the input/output terminals and the input/output devices; and a register controlling the multiplexer;

wherein the reorderer is programmed by setting the register.

4. The memory controller of claim 1, wherein the at least two different pad sequences support DDR1 and DDR2 SDRAMs, respectively.

5. The memory controller of claim 1, wherein the at least one memory device and the single chip is packaged in a multiple chip module or a stacked-die package.

6. The memory controller of claim 1, wherein the input/output terminals comprise data I/O terminals constantly connected to corresponding pads.

7. A method to optimize the pad sequence of a memory controller, comprising:

providing at least two different preferred trace sequences for two different memory devices;

providing the memory controller on a single chip, the memory controller comprising:

a core logic circuit having input/output terminals;

a plurality of input/output (I/O) devices on the single chip, each having a pad; and a reorderer coupled between the core logic circuit and the input/output devices, wherein the reorderer is programmable to selectively connect the input/output devices to the input/output terminals; and programming the reorderer to select and connect a portion of the input/output devices to the input/output terminals such that one of the different preferred trace sequences is substantially supported.

8. The method of claim 7, wherein programming utilizes interconnection layer switching.

9. The method of claim 7, wherein the reorderer comprises:

a multiplexer connected between the input/output terminals and the input/output devices; and a register controlling the multiplexer;

wherein the reorderer is programmed by setting the register.

10. The method of claim 7, wherein the different memory devices comprise DDR1 and DDR2 SDRAMs.

11. The method of claim 7, further comprising:

packaging the single chip and one of the different memory devices in one package.

* * * * *